(12) United States Patent
Capetillo (10) Patent No.: US 11,641,163 B2
(45) Date of Patent: May 2, 2023

(54) TRANS-INDUCTOR VOLTAGE REGULATOR WITH AVERAGING INDUCTOR DCR CURRENT SENSING

(71) Applicant: MONOLITHIC POWER SYSTEMS, INC., San Jose, CA (US)

(72) Inventor: Ricardo Capetillo, Fremont, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 118 days.

(21) Appl. No.: 17/399,284

(22) Filed: Aug. 11, 2021

(65) Prior Publication Data

US 2023/0049859 A1    Feb. 16, 2023

(51) Int. Cl.
*H02M 1/00* (2006.01)
*H02M 3/335* (2006.01)
*H02M 1/084* (2006.01)

(52) U.S. Cl.
CPC ..... *H02M 3/33569* (2013.01); *H02M 1/0009* (2021.05); *H02M 1/084* (2013.01); *H02M 1/007* (2021.05); *H02M 1/0077* (2021.05)

(58) Field of Classification Search
CPC .. H02M 1/007; H02M 1/0077; H02M 1/0083; H02M 1/0085; H02M 1/0095
See application file for complete search history.

(56) References Cited

U.S. PATENT DOCUMENTS

| | | | | |
|---|---|---|---|---|
| 8,072,200 | B1* | 12/2011 | Qiu | H02M 3/1584 323/907 |
| 9,214,866 | B2* | 12/2015 | Nora | H02J 1/102 |
| 2012/0092908 | A1* | 4/2012 | Piotr | H01F 30/02 363/71 |
| 2012/0286769 | A1* | 11/2012 | Torti | G01R 29/16 324/107 |
| 2015/0370295 | A1* | 12/2015 | Luo | H02M 3/1584 713/330 |
| 2016/0011614 | A1* | 1/2016 | Jiang | H02M 3/158 323/233 |
| 2016/0359489 | A1* | 12/2016 | Guthrie | H02M 3/1584 |

OTHER PUBLICATIONS

Defensive Publication Series, Fast multi-phase trans-inductor voltage regulator, May 9, 2019, pp. 1-15, published by Technical Disclosure Commons.

* cited by examiner

*Primary Examiner* — Gary A Nash
(74) *Attorney, Agent, or Firm* — Beyer Law Group LLP (57) ABSTRACT

A trans-inductor voltage regulator (TLVR) has regulator blocks and transformers. Secondary windings of the transformers are connected in series with a compensation inductor to form a trans-inductor loop, which is connected to the output voltage of the TLVR instead of to ground. Primary windings of the transformers serve as output inductors of the regulator blocks. The inductance of each output inductor and the output inductance of the TLVR are input to an averaging network of an averaging inductor direct current resistance (DCR) current sense circuit to generate an average sensed voltage. The average sensed voltage is converted to an average sensed current, which is used by a controller to generate control signals that drive the regulator blocks to generate the output voltage of the TLVR.

18 Claims, 9 Drawing Sheets

TRANS-INDUCTOR VOLTAGE REGULATOR WITH AVERAGING INDUCTOR DCR CURRENT SENSING

TECHNICAL FIELD

The present invention is directed to trans-inductor voltage regulators.

BACKGROUND

A trans-inductor voltage regulator (TLVR) is a type of voltage regulator that uses a primary winding of a transformer as an output inductor. In a multiphase TLVR, the secondary windings of the transformers of all the phases are connected in a series loop to ground. Because of the series connection of the secondary windings, all of the phases are able to respond to a change in load current, allowing for a faster transient response compared to other voltage regulator topology.

A TLVR may employ constant ON-time current-mode control to generate and maintain its output voltage at a regulated level. Current mode control involves using a sensed current, which is indicative of the current flowing through the output inductor, as part of the constant ON-time current-mode control loop. A multiphase TLVR may utilize a separate sensed current for each phase or an average sensed current for all phases. The sensed current may be generated by using a sense resistor, using the direct current resistance (DCR) of the output inductor, or some other way to sense the current through the output inductor.

Embodiments of the present invention pertain to a TLVR with averaging inductor DCR current sensing.

BRIEF SUMMARY

In one embodiment, a multiphase power supply includes a multiphase TLVR, an averaging inductor direct current resistance (DCR) current sense circuit, and a pulse width modulation (PWM) controller. The TLVR includes regulator blocks, transformers, and a compensation inductor. Each transformer has a primary winding that serves as an output inductor of a regulator block. The secondary windings of the transformers and a compensation inductor are connected in series to form a trans-inductor loop that is connected to an output voltage of the TLVR instead of to ground. The averaging inductor DCR current sense circuit is connected to the output voltage of the TLVR, switch node voltages of the regulator blocks, and a compensation inductor voltage of the compensation inductor to generate an average sensed voltage. The average sensed voltage may be converted to an average sensed current using a transconductance amplifier, for example. The PWM controller generates PWM signals to drive the regulator blocks to generate phases of the output voltage of the TLVR based at least on the average sensed current.

In another embodiment, an electrical circuit includes a compensation inductor, transformers, and regulator blocks. Each transformer has a first winding and a second winding that are separated by a core. The second windings of the transformers are connected in series with the compensation inductor to form a trans-inductor loop that is connected to an output voltage of a TLVR instead of to ground. Each regulator block generates a phase of the output voltage of the TLVR, with a first winding of a transformer being configured as an output inductor through which an output current of the regulator block flows.

In yet another embodiment, a method of generating an output voltage of a multiphase TLVR includes connecting a trans-inductor loop of the TLVR to an output voltage of the TLVR instead of to ground, wherein the trans-inductor loop comprises a compensation inductor that is connected in series with second windings of transformers. Currents through the compensation inductor and first windings of the transformers are sensed to generate an average sensed current. Control signals that drive regulator blocks are generated based at least on the average sensed current, with each of the regulator blocks being configured to generate current that flows through a first winding of a corresponding transformer to generate a phase of the output voltage of the TLVR.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of electrical circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
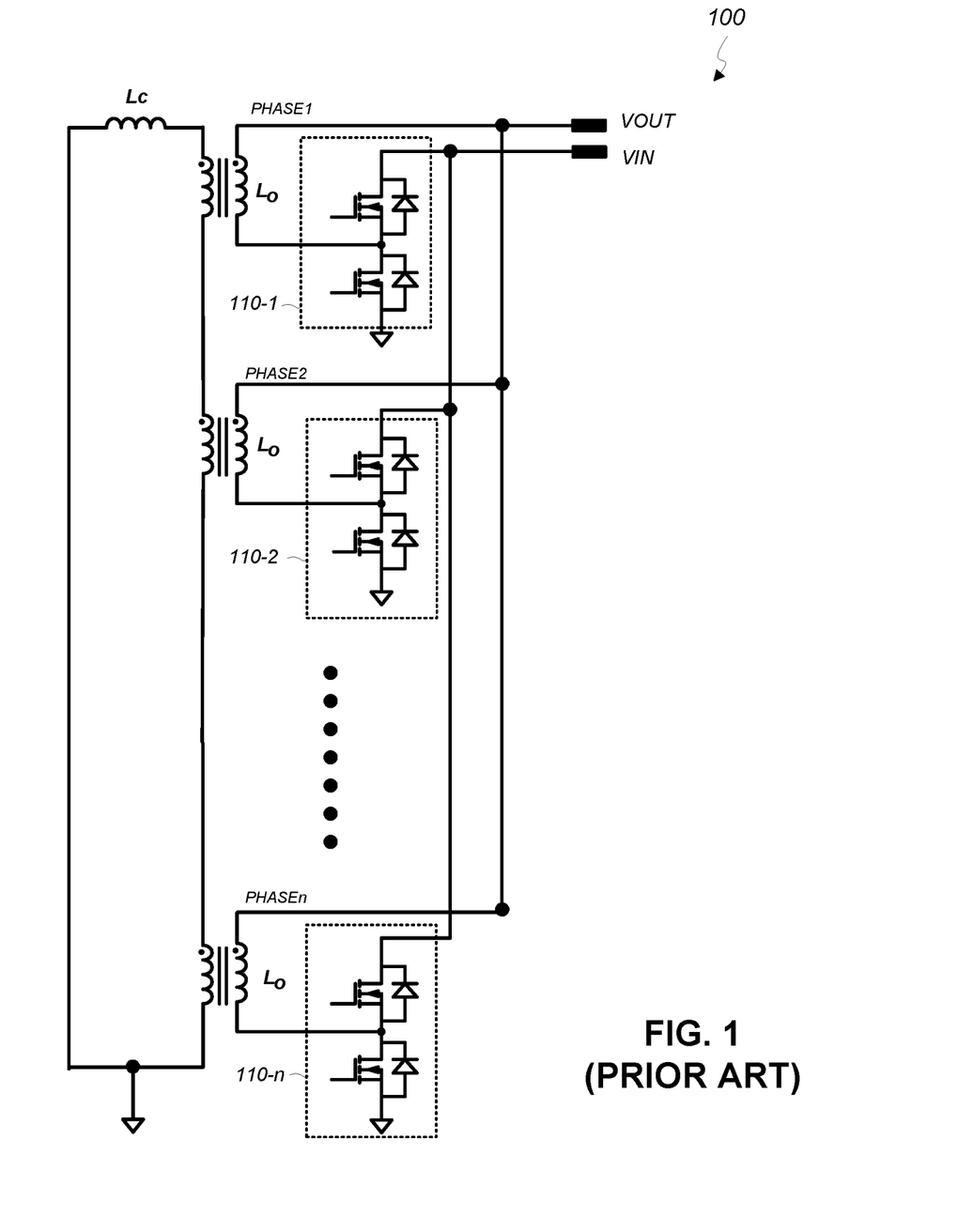
FIG. 1 (Prior art) shows a schematic diagram of a conventional TLVR.

FIG. 1 shows a schematic diagram of a conventional multiphase TLVR 100. The TLVR 100 comprises a plurality of regulator blocks 110 (i.e., 110-1, 110-2, ..., 110-*n*). Each regulator block 110 generates a phase of the output voltage VOUT of the TLVR 100. In the example of FIG. 1, the regulator block 110-1 generates a first phase ("PHASE1") of the output voltage VOUT, the regulator block 110-2 generates a second phase ("PHASE2") of the output voltage VOUT, etc. Each regulator block 110 includes a pair of switches that is driven by a corresponding pulse width modulation (PWM) signal from a PWM controller (not shown). The high-side switches of the regulator blocks 110 are connected to an input voltage VIN, and the low-side switches of the regulator blocks 110 are connected to ground. The PWM signals are interleaved to drive the regulator blocks 110 to generate the output voltage VOUT.

In general, a transformer has a first winding and a second winding that are separated by a core. The windings of the transformer are also referred to as a primary winding and a secondary winding. In the example of FIG. 1, each regulator block 110 has a corresponding transformer whose primary winding serves as an output inductor Lo of the regulator block 110. The output current of a regulator block 110 flows through the output inductor Lo. The secondary winding of the transformer is connected in series with the secondary windings of the transformers of the other regulator blocks 110. A trans-inductor loop is formed by connecting a compensation inductor Lc in series with the secondary windings of the transformers. The trans-inductor loop of the TLVR 100 is grounded.

Figure 2:
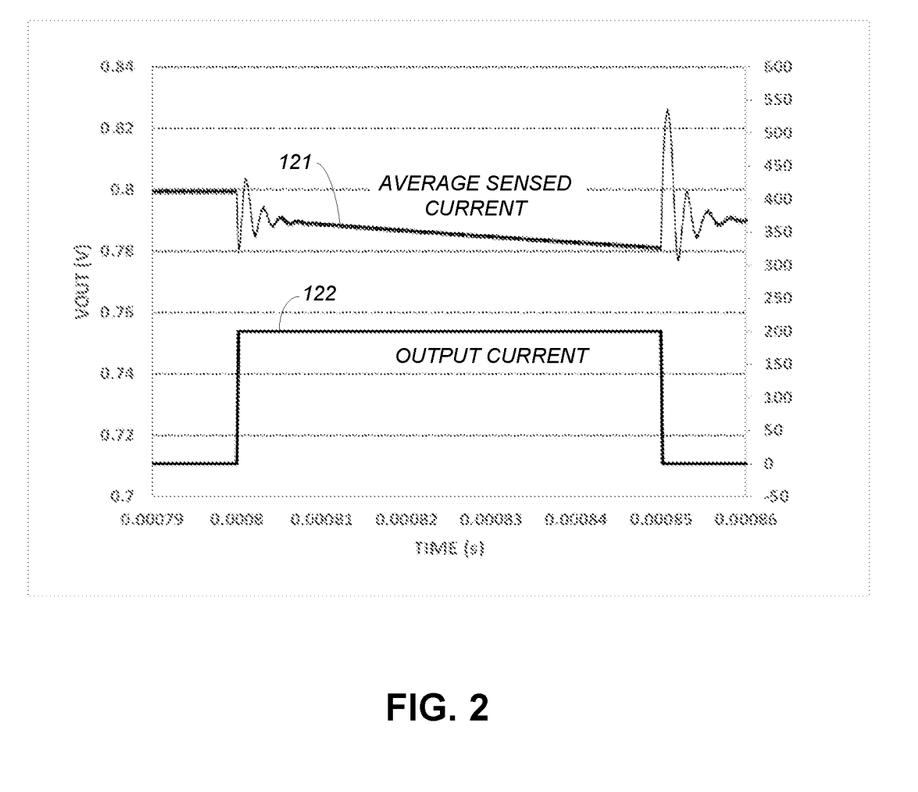
FIG. 2 shows a plot of average sensed current and a plot of output current of the TLVR of FIG. 1

The inventor identified a potential problem with the TLVR 100. In particular, when used in conjunction with averaging inductor DCR current sensing, the average sensed current may introduce instability and lag in the constant ON-time current-mode control loop. This is illustrated in FIG. 2, which shows a plot 121 of average sensed current that is generated by averaging inductor DCR current sensing and a plot 122 of output current of the TLVR 100. The plots 121 and 122 are from a simulation.

In FIG. 2, the left vertical axis represents output voltage VOUT levels in Volts, the horizontal axis represents time in seconds, and the right vertical axis represents output current levels in Amps. It is to be noted that the signals represented in FIG. 2 may be scaled for use internally by a PWM controller to implement a so called Load-Line (LL), for example. During a transient load condition, i.e., when the output current rapidly changes (see plot 122), the average sensed current lags the output current and as a result losses phase margin and could become unstable (see ringing on plot 121). This makes the average sensed current unreliable as a basis for generating PWM signals to drive the regulator blocks to generate the output voltage VOUT.

Figure 3:
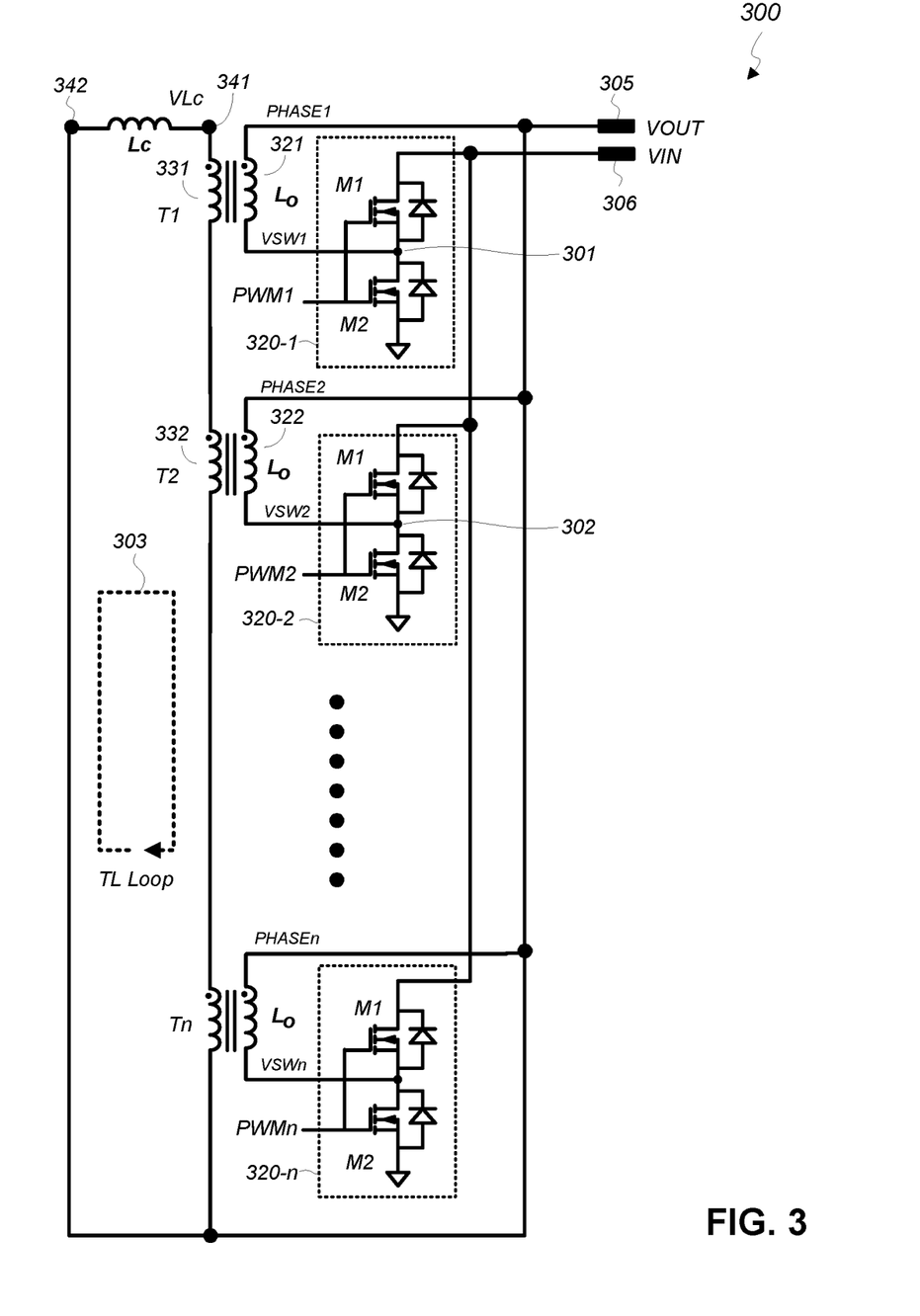
FIG. 3 shows a schematic diagram of a multiphase TLVR in accordance with an embodiment of the present invention.

Referring now to FIG. 3, there is shown a schematic diagram of a multiphase TLVR 300 in accordance with an embodiment of the present invention. In the example of FIG. 3, the TLVR 300 comprises a plurality of regulator blocks 320 (i.e., 320-1, 320-2, . . . , 320-n). Each regulator block 320 generates a phase of the output voltage VOUT of the TLVR 300. In the example of FIG. 3, the regulator block 320-1 generates a first phase ("PHASE1") of the output voltage VOUT, the regulator block 320-2 generates a second phase ("PHASE2") of the output voltage VOUT, etc.

A regulator block 320 may be, for example, a buck regulator. In the example of FIG. 3, each regulator block 320 comprises a high-side switch M1 and a low-side switch M2. Each of the switches M1 and M2 may be a Metal-Oxide-Semiconductor Field-Effect transistor (MOSFET), bipolar transistor, or some other type of transistor. In the example of FIG. 3, a first end of the high-side switch M1 is connected to an input voltage VIN of the TLVR 300 at a node 306, and a second end of the high-side switch M1 is connected to a switch node that the high-side switch M1 forms with the low-side switch M2. A first end of the low-side switch M2 is connected to the second end of the high-side switch M1 to form the switch node, and a second end of the low-side switch M2 is connected to ground. In the example of FIG. 3, a switch node voltage VSW1 is developed at a switch node 301 of the regulator block 320-1, a switch node voltage VSW2 is developed at a switch node 302 of the regulator block 320-2, etc.

In the example of FIG. 3, the third ends of the switches M1 and M2 are connected together to be driven by a corresponding control signal, which in one embodiment is a PWM signal. In the example of FIG. 3, a first PWM signal ("PWM1") drives the switches M1 and M2 of the regulator block 320-1, a second PWM signal ("PWM2") drives the switches M1 and M2 of the regulator block 320-2, etc. The PWM signals (i.e., PWM1, PWM2, . . . , PWMn) are interleaved to develop the output voltage VOUT of the TLVR 300 at an output node 305.

The output current of a regulator block 320 flows through an output inductor Lo. In the example of FIG. 3, a regulator block 320 has a corresponding transformer whose primary winding serves as the output inductor Lo of the regulator block 320. For example, referring to the regulator block 320-1, a transformer T1 has a primary winding 321 with a first end that is connected to the switch node 301 and a second end that is connected to the output node 305. The winding 321 serves as the output inductor Lo of the regulator block 320-1. Similarly, referring to the regulator block 320-2, a transformer T2 has a primary winding 322 with a first end that is connected to the switch node 302 and a second end that is connected to the output node 305. The winding 322 serves as the output inductor Lo of the regulator block 320-2. Each of the transformers T1, T2, . . . , and Tn may have a primary to secondary turns ratio of 1:1, for example.

The secondary windings of the transformers T1, T2, . . . , and Tn of the regulator blocks 320 are connected in series along with a compensation inductor Lc to form a trans-inductor loop (see FIG. 3, 303). More particularly, the compensation inductor Lc, a secondary winding 331 of the transformer T1, a secondary winding 332 of the transformer T2, and the secondary windings of the other transformers are connected in series to form the trans-inductor loop of the TLVR 300.

It is to be noted that in marked contrast to a conventional TLVR, the trans-inductor loop of the TLVR 300 is not connected to ground. Instead, the trans-inductor loop of the TLVR 300 is connected to the output voltage VOUT. Accordingly, the current through the trans-inductor loop develops a compensation inductor voltage VLc at a node 341 on an end of the compensation inductor Lc, and a node 342 on the other end of the compensation inductor Lc is connected to the output voltage VOUT. As will be more apparent below, this allows the output inductance of the TLVR 300 to be input to an averaging inductor DCR current sense circuit to stabilize the constant ON-time current-mode control loop. In general, the output inductance of each phase of a TLVR may be approximated by Lc/n, and the overall output inductance of the TLVR may be approximated by $Lc/n^2$, where Lc is the inductance of the compensation inductor and n is the number of phases of the TLVR.

In the example of FIG. 3, the transformers are depicted as having a single primary winding and a single secondary winding for illustration purposes. As can be appreciated, embodiments of the present invention are also applicable to TLVR's that employ transformers with different number of windings or different winding configurations.

Figure 4:
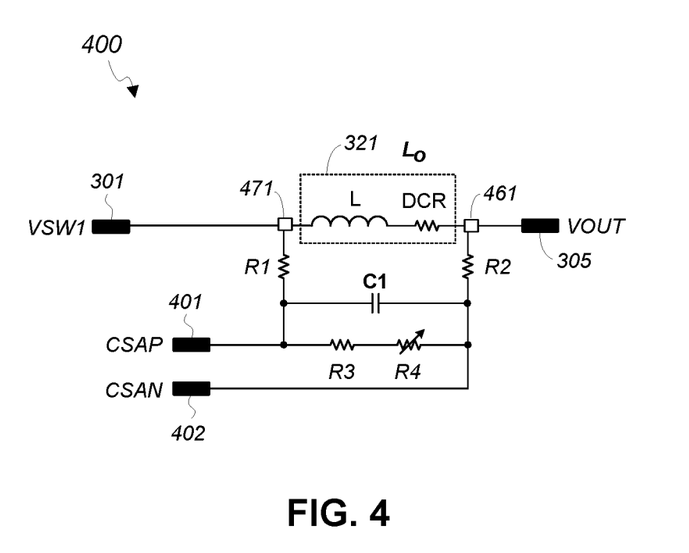
FIG. 4 shows a schematic diagram of an inductor DCR current sense circuit in accordance with an embodiment of the present invention.

FIG. 4 shows a schematic diagram of an inductor DCR current sense circuit 400 in accordance with an embodiment of the present invention. The current sense circuit 400 is for a single phase. A multiphase TLVR will have a plurality of sense circuits 400, one for each phase.

In general, inductor DCR current sensing uses the parasitic DCR of the output inductor Lo to sense the current flowing through the output inductor Lo. A resistor-capacitor (RC) network is placed in parallel with a series inductance L and parasitic DCR of the output inductor Lo, and a sensed voltage is measured across the capacitor of the RC network. The time constant of the RC network is designed to match the time constant of the series inductance L and parasitic DCR. It is to be noted that the DCR of an output inductor Lo may be sensed between a switch node and the output node. For example, to perform inductor DCR current sensing for the first phase, the RC network may be placed between the switch node 301 and the output node 305.

The current sense circuit 400 is explained using the first phase (i.e., regulator block 320-1) of the TLVR 300 of FIG. 3 as an example. The winding 321 of the transformer T1 serves as the output inductor Lo of the regulator block 320-1. The current sense circuit 400 comprises an RC network that includes a capacitor C1 and resistors R3 and R4. The resistors R3 serves as a series resistor and the variable resistor R4 serves as a thermal compensation resistor (e.g., negative thermal coefficient (NTC) thermistor). The inductor 321 has a pad 461 on one end and a pad 471 on the other end. The RC network is connected across the winding 321 by a resistor R1 to the pad 471 and a resistor R2 to the pad 461. The pad 461 is connected to the output node 305 of the output voltage VOUT, whereas the pad 471 is connected to the switch node 301 of the switch node voltage VSW1. To accurately sense the effect of the parasitic DCR, the pads 461 and 471 are as close as possible to the ends of the primary winding 321.

The voltage that develops across the capacitor C1 is the sensed voltage, which is across the nodes 401 and 402. The sensed voltage is indicative or representative of the current through the winding 321. The nodes 401 and 402 may be connected to input pins (labeled as "CSAP" and "CSAN" in this example) of a corresponding PWM controller. The PWM controller may include a transconductance amplifier that converts the sensed voltage to a sensed current. The PWM controller may employ the sensed current to generate a first PWM signal (PWM1) to drive the first phase, i.e., regulator block 320-1. For the TLVR 300, which is multiphase, a plurality of sense circuits 400 are needed, one for each phase. Furthermore, the PWM controller may require separate sensed voltage input pins and transconductance amplifiers for each phase.

Figure 5:
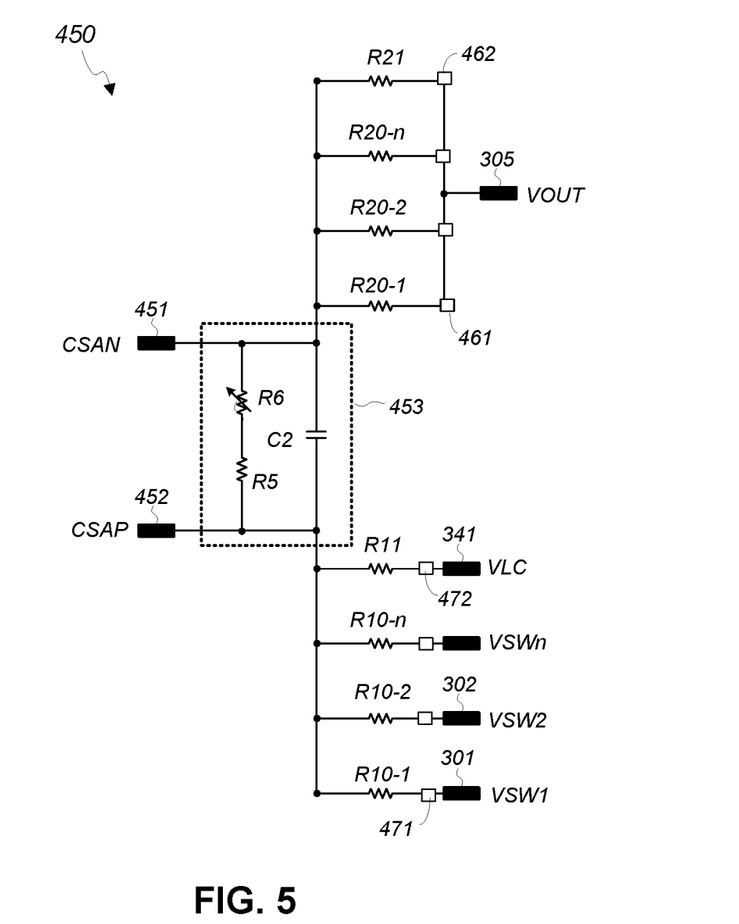
FIG. 5 shows a schematic diagram of an averaging inductor DCR current sense circuit in accordance with an embodiment of the present invention.

For cost, design simplicity, or other reasons, a constant ON-time current-mode control loop of a PWM controller may employ an average sensed current, which is indicative or representative of currents through the output inductors of all the phases. FIG. 5 shows a schematic diagram of an averaging inductor DCR current sense circuit 450 in accordance with an embodiment of the present invention. The current sense circuit 450 is configured to sense the currents that flow through the compensation inductor and the output inductors.

Similar to the current sense circuit 400, the current sense circuit 450 includes an RC network 453 for inductor DCR current sensing. In the example of FIG. 5, the RC network 453 is formed by a capacitor C2 and resistors R5 and R6. The resistor R5 serves as a series resistor and the variable resistor R6 serves as a thermal compensation resistor (e.g., NTC thermistor). As its name indicates, the current sense circuit 450 further includes an averaging network comprising a resistor R11, a resistor R21, resistors R10 (i.e., R10-1, R10-2, . . . , and R10-n), and resistors R20 (i.e., R20-1, R20-2, . . . , R20-n).

The output inductor Lo of each regulator block 320 is between the switch node voltage of the regulator block 320 and the output voltage VOUT. More particularly, the output inductor Lo of the regulator block 320-1 is between the output voltage VOUT at the output node 305 and the switch node voltage VSW1 at the switch node 301, the output inductor Lo of the regulator block 320-2 is between the output voltage VOUT at the output node 305 and the switch node voltage VSW2 at the switch node 302, etc. The RC network 453 has a node 451 and a node 452 across which the average sensed voltage is measured. By connecting the node 451 to the output node 305 and the node 452 to each of the switch nodes, the RC network 453 is placed in parallel with each of the output inductors Lo, thus allowing for detection of an average sensed current that is indicative or representative of the currents through the output inductors Lo of all the phases.

In the example of FIG. 5, each switch node is connected to the node 452 by way of a resistor R10. More particularly, a resistor R10-1 connects the switch node 301 to the node 452, a resistor R10-2 connects the switch node 302 to the node 452, etc. In one embodiment, all of the resistors R10 have the same resistance value. The resistor R11 connects the compensation inductor voltage VLc at the node 341 to the node 452.

In the example of FIG. 5, the output voltage VOUT is connected to the node 451 by a plurality of resistors R20 and a resistor R21. The resistor R21 is for the connection between the trans-inductor loop and the output voltage VOUT, and each resistor R20 is for a phase of the TLVR 300. In the example of FIG. 5, all of the resistors R20 and R21 have the same resistance value. In one embodiment, each of the resistors R20 and R21 has a resistance of 10Ω.

For more accurate DCR current sensing, a plurality of resistors R20 and a resistor R21 are employed so that each of the resistors R20 and R21 can be directly connected to a corresponding pad of the inductor, which in this case is the pad that is connected to the output voltage VOUT. Similarly, a plurality of resistors R10 and the resistor R11 are employed so that each of the resistors R10 and R11 can be directly connected to a corresponding pad of the inductor, which in this case is the pad that is connected to a switch node voltage VSW or the compensation inductor voltage VLC. For example, the primary winding 321 of the regulator block 320-1 has a pad 461 and a pad 471, with the pad 461 being connected to the output voltage VOUT and the pad 471 being connected to the switch node voltage VSW1. To connect the primary winding 321 for DCR current sensing, a resistor R20-1 connects the pad 461 to the node 451 and a resistor R10-1 connects the pad 471 to the node 452. Similarly, the compensation inductor Lc has a pad 462 and a pad 472, with the pad 462 being connected to the output voltage VOUT and the pad 471 being connected to the compensation inductor voltage VLc. To connect the compensation inductor Lc for DCR current sensing, the resistor R21 connects the pad 462 to the node 451 and the resistor R11 connects the pad 472 to the node 452.

To stabilize the constant ON-time current-mode control loop for regulating the output voltage VOUT, the trans-inductor loop of the TLVR 300 is connected to the output voltage VOUT instead of to ground and the output inductance of the TLVR 300 is included as an input to the averaging network of the current sense circuit 450. In the example of FIG. 5, the output inductance of the TLVR 300 is included as an input to averaging network of the current sense circuit 450 by using the resistor R11 to connect the compensation inductor voltage VLc at the node 341 to the node 452 and using the resistor R21 to connect the node 451 to the output voltage VOUT at the output node 305. This results in the current through compensation inductor Lc being sensed by the current sense circuit 450 along with the currents through the output inductors Lo of all the regulator blocks 320 to generate an average sensed voltage, which is converted to an average sensed current for the constant ON-time current-mode control loop.

In general, the values of the components described herein depend on the requirements of the particular application, such as the output current, steady state time constant of the RC network, the impedance expected by the PWM controller across the nodes 452 and 451, etc. In one embodiment, the value of the resistor R11 is the value of a resistor R10 divided by the number of phases. For example, assuming each resistor R10 has a resistance of 13.4 KΩ and there are eight phases, the resistance of the resistor R11 may be approximately 13.4 KΩ/8 (e.g., 1.65 KΩ). Lowering the resistance of the resistor R11 relative to the resistors R10 increases the weight contributed by the output inductance of the TLVR 300 to the average sensed current. This weighing may be adjusted to optimize performance parameters of the TLVR 300.

Figure 6:
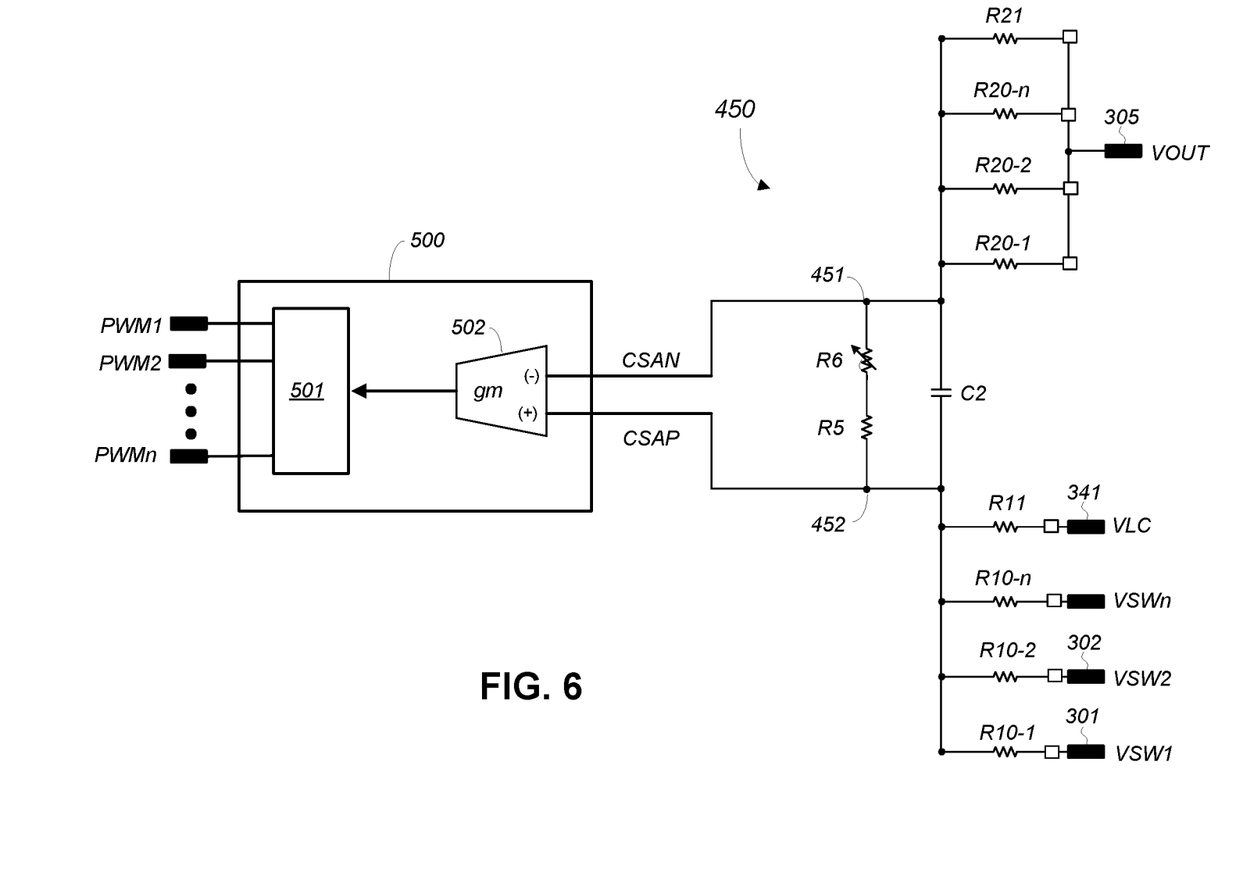
FIG. 6 shows a schematic diagram of the averaging inductor DCR current sense circuit of FIG. 5 as connected to a PWM controller in accordance with an embodiment of the present invention.

FIG. 6 shows a schematic diagram of the current sense circuit 450 as connected to a PWM controller 500 in accordance with an embodiment of the present invention. The PWM controller 500 includes a PWM signal generator 501 and a transconductance amplifier 502. Other components of the PWM controller 500 that are not relevant to the understanding of the present disclosure are not shown in the interest of brevity and clarity.

In one embodiment, the PWM controller 500 is a multiphase, constant ON-time, current-mode control PWM controller. The PWM controller 500 may be a commercially-available PWM controller or adapted from a pre-existing PWM controller. Generally, PWM controllers are commercially-available from various vendors including Monolithic Power Systems, Inc.

In the example of FIG. 6, the PWM controller 500 is packaged as an integrated circuit that has a plurality of pins, including a CSAN pin and a CSAP pin for receiving an average sensed voltage across the nodes 451 and 452 of the current sense circuit 450. The average sensed voltage is input to the transconductance amplifier 502, which converts the average sensed voltage to an average sensed current that is input to the PWM signal generator 501. The PWM signal generator generates the interleaved PWM signals (i.e., PWM1, PWM2, etc.) based on the average sensed current using a conventional PWM algorithm.

Figure 7:
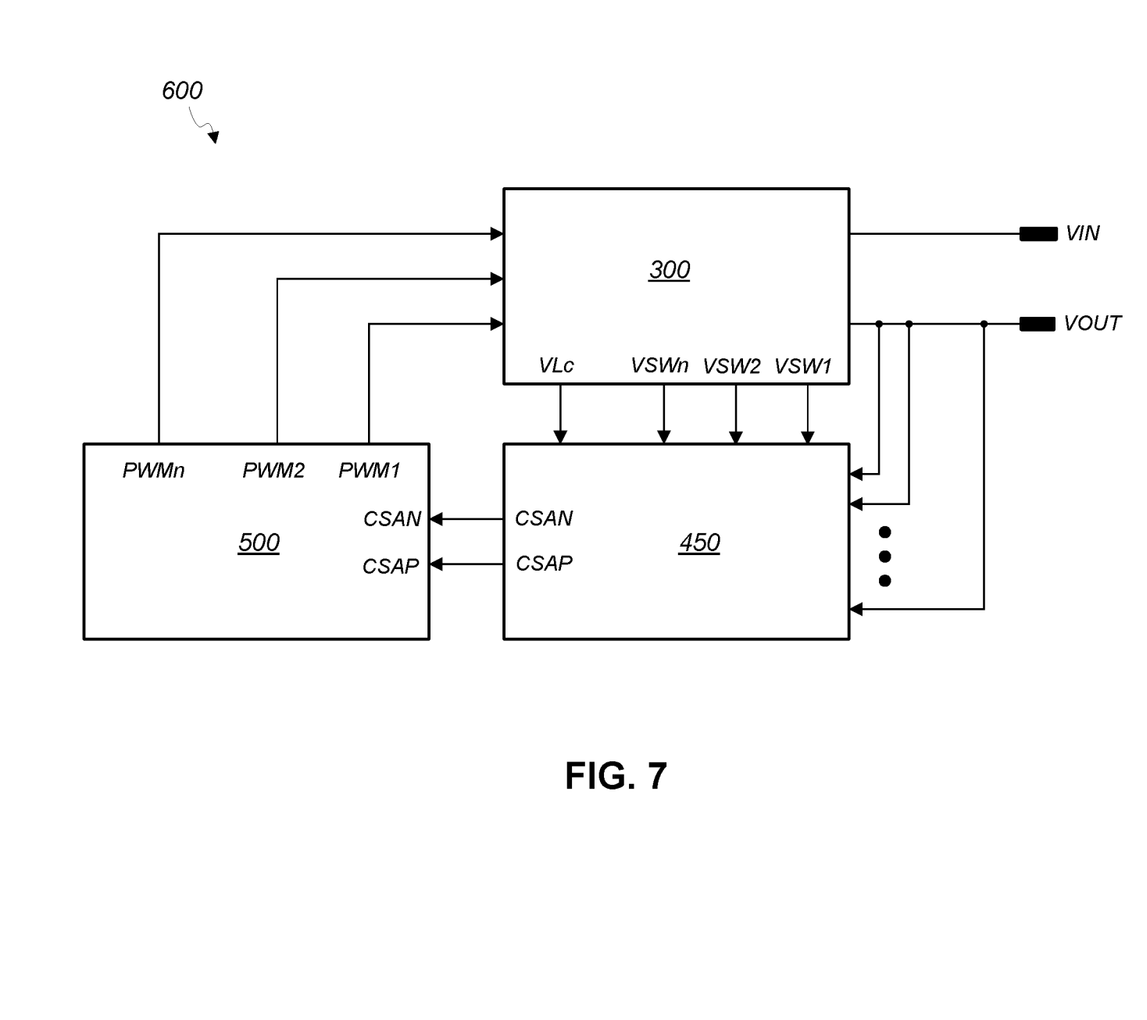
FIG. 7 shows a schematic diagram of a multiphase power supply circuit in accordance with an embodiment of the present invention.

FIG. 7 shows a schematic diagram of a multiphase power supply circuit 600 in accordance with an embodiment of the present invention. In the example of FIG. 7, the power supply circuit 600 comprises the TLVR 300, the current sense circuit 450, and the PWM controller 500. The TLVR 300 receives an input voltage VIN and generates an output voltage VOUT. The current sense circuit 450 is connected to sense currents the flow through the compensation inductor Lc and output inductors Lo of the TLVR 300 by way of connections to the nodes of the output voltage VOUT, the compensation inductor voltage VLc, and the switch node voltages VSW (i.e., VSW1, VSW2, etc.). The current sense circuit 450 generates an average sensed voltage based on the sensed currents through the compensation inductor Lc and output inductors Lo. The average sensed voltage is input to the CSAN and CSAP pins of the PWM controller 500. The PWM controller 500 converts the average sensed voltage to an average sensed current, which the PWM controller 500 uses to generate interleaved PWM signals (PWM1, PWM2, etc.) that drive regulator blocks 320 of the TLVR 300 to generate the output voltage VOUT.

Figure 8:
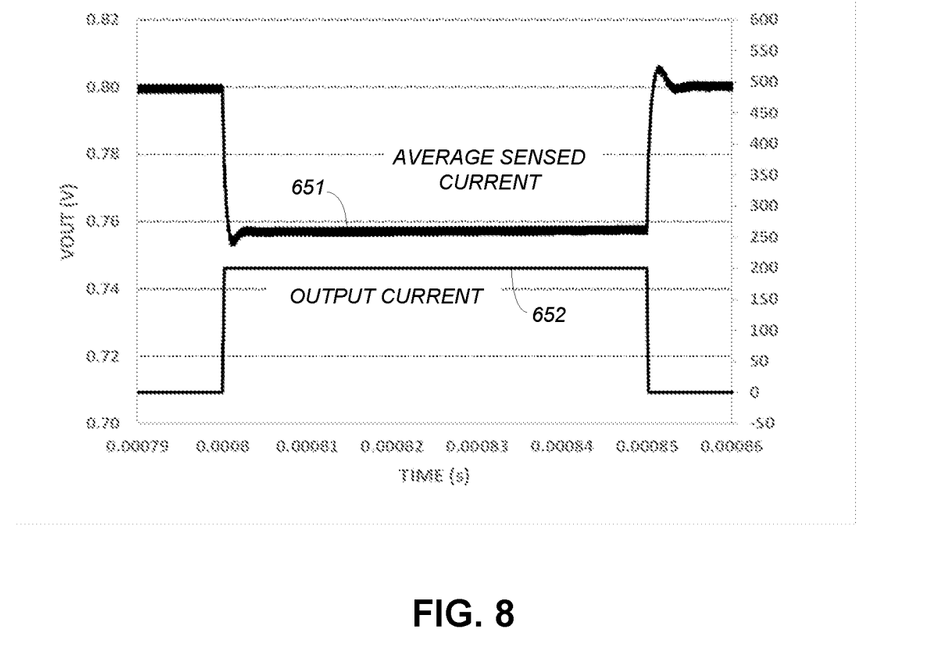
FIG. 8 shows a plot of average sensed current and a plot of output current of the power supply circuit of FIG. 7 in accordance with an embodiment of the present invention.

FIG. 8 shows a plot 651 of average sensed current and a plot 652 of output current of the power supply 600 in accordance with an embodiment of the present invention. The plots 651 and 652 are from a simulation. In the example of FIG. 8, the left vertical axis represents output voltage VOUT levels in Volts, the horizontal axis represents time in seconds, and the right vertical axis represents output current levels in Amps. It is to be noted that the signals represented in FIG. 8 may be scaled for use internally by the PWM controller 500 to implement a so called Load-Line (LL), for example. The novel topology of the TLVR 300 in conjunction with the averaging inductor DCR current sensing of the current sense circuit 450 help keep the average sensed current (plot 651) stable and in-phase with the output current (plot 652) during transient load conditions.

Figure 9:
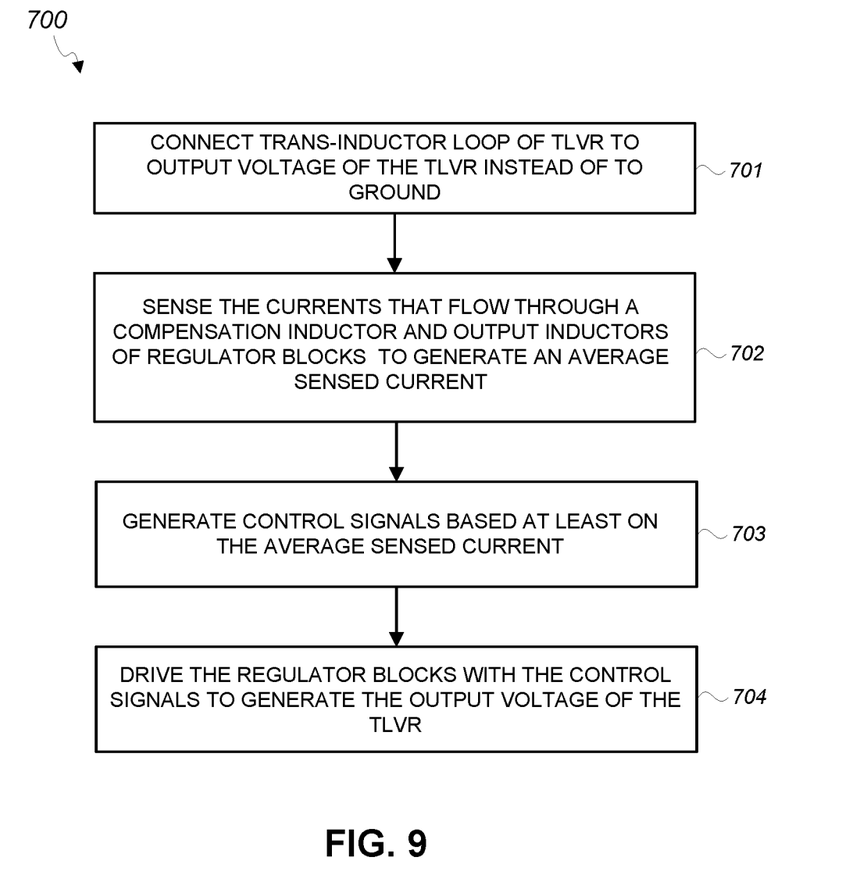
FIG. 9 shows a flow diagram of a method of generating an output voltage of a TLVR in accordance with an embodiment of the present invention.

FIG. 9 shows a flow diagram of a method 700 of generating an output voltage of a TLVR in accordance with an embodiment of the present invention. The method 700 is explained using previously disclosed components for illustration purposes only. As can be appreciated, other components may also be employed without detracting from the merits of the present invention.

In the example of FIG. 9, the trans-inductor loop of the TLVR is connected to the output voltage instead of to ground (step 701). The trans-inductor loop comprises the series-connected secondary windings of the transformers and the compensation inductor of the TLVR. The primary windings of the transformers serve as output inductors of the regulator blocks of the TLVR.

The currents that flow through the compensation inductor and through the output inductor of each regulator block are sensed to generate an average sensed current (step 702). For example, an average sensed voltage may be generated using an averaging inductor DCR current sense circuit that receives the output inductance of the TLVR and the inductance of each of the output inductors as inputs. The average sensed voltage may be developed across a capacitor of the RC network of the averaging inductor DCR current sense circuit. The average sensed voltage may be converted to the average sensed current using, for example, a transconductance amplifier. Control signals in the form of interleaved PWM signals are generated by a PWM controller based at least on the average sensed current (step 703). The PWM signals drive corresponding regulator blocks of the TLVR to generate the output voltage of the TLVR (step 704).

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A multiphase power supply comprising:
  a multiphase trans-inductor voltage regulator (TLVR) comprising a plurality of regulator blocks, a plurality of transformers, and a compensation inductor, each of the plurality of transformers comprising a primary winding that serves as an output inductor of a corresponding regulator block of the plurality of regulator blocks and a secondary winding, the secondary windings of the plurality of transformers being connected in series with the compensation inductor to form a trans-inductor loop that is connected to an output voltage of the TLVR instead of to ground;
an averaging inductor direct current resistance (DCR) current sense circuit that is connected to receive the output voltage of the TLVR, a plurality of switch node voltages of the plurality of regulator blocks, and a compensation inductor voltage of the compensation inductor to generate an average sensed voltage; and
a pulse width modulation (PWM) controller that is configured to generate a plurality of PWM signals that drives the regulator blocks to generate the output voltage of the TLVR based at least on the average sensed voltage.

2. The multiphase power supply of claim 1, wherein the PWM controller comprises:
a transconductance amplifier that converts the average sensed voltage to an average sensed current; and
a PWM signal generator that generates the plurality of PWM signals in accordance with the average sensed current.

3. The multiphase power supply of claim 1, wherein the averaging inductor DCR sense circuit comprises an averaging network and a resistor-capacitor (RC) network, the RC network comprising a series resistor and a capacitor, and the average sensed voltage is developed at least across the capacitor of the RC network.

4. The multiphase power supply of claim 3, wherein the RC network of the averaging inductor DCR current sense circuit further comprises:
a thermal compensation resistor;
wherein the series resistor and the thermal compensation resistor form a series circuit that is connected in parallel with the capacitor.

5. The multiphase power supply of claim 3, wherein the averaging network of the averaging inductor DCR current sense circuit comprises:
a first resistor that connects the compensation inductor voltage to a first end of the RC network;
a plurality of second resistors that each connects a switch node voltage of the plurality of switch node voltages to the first end of the RC network; and
a plurality of third resistors that each connects a second end of the RC network to the output voltage.

6. The multiphase power supply of claim 1, wherein each of the plurality of regulator blocks comprises a high-side switch and a low-side switch, a first end of the high-side switch being connected to an input voltage, a second end of the high-side switch being connected to a first end of the low-side switch to form a switch node of the regulator block, a second end of the low-side switch being connected to ground, a third end of the high-side switch being connected to a third end of the low-side switch, and a PWM signal of the plurality of PWM signals drive the third ends of the high-side switch and the low-side switch.

7. An electrical circuit comprising:
a compensation inductor;
a plurality of transformers, each transformer of the plurality of transformers comprising a first winding and a second winding that are separated by a core, the second windings of the plurality of transformers being connected in series with the compensation inductor to form a trans-inductor loop that is connected to an output voltage of a trans-inductor voltage regulator (TLVR); and
a plurality of regulator blocks, each regulator block of the plurality regulator blocks being configured to generate a phase of the output voltage of the TLVR, the regulator block having a first winding of a corresponding transformer of the plurality of transformers as an output inductor of the regulator block.

8. The electrical circuit of claim 7, further comprising an averaging inductor direct current resistance (DCR) current sense circuit, the averaging inductor DCR current sense circuit comprising a resistor-capacitor (RC) network, a first end of the RC network being connected to the output voltage of the TLVR, and a second end of the RC network being connected to a compensation inductor voltage on the compensation inductor and to switch node voltages of the plurality of regulator blocks to generate an average sensed voltage.

9. The electrical circuit of claim 8, wherein the averaging inductor DCR current sense is configured to generate the average sensed voltage across a capacitor of the RC network.

10. The electrical circuit of claim 8, further comprising:
a transconductance amplifier that is configured to convert the average sensed voltage to an average sensed current.

11. The electrical circuit of claim 7, wherein each regulator block of the plurality of regulator blocks comprises a high-side switch and a low-side switch that are configured to be driven by a control signal to generate a phase of the output voltage of the TLVR.

12. The electrical circuit of claim 11, wherein a first end of the high-side switch is connected to an input voltage, a second end of the high-side switch is connected to a first end of the low-side switch to form a switch node, and a second end of the low-side switch is connected to ground.

13. The electrical circuit of claim 12, wherein a third end of the high-side switch is connected to a third end of the low-side switch to receive a control signal for driving the high-side switch and the low-side switch to generate the phase of the output voltage of the TLVR.

14. The electrical circuit of claim 13, wherein the control signal is a pulse width modulation (PWM) signal.

15. A method comprising:
connecting a trans-inductor loop of a trans-inductor voltage regulator (TLVR) to an output voltage of the TLVR instead of to ground, wherein the trans-inductor loop comprises a compensation inductor that is connected in series with a second winding of each transformer of a plurality of transformers;
sensing currents that flow through the compensation inductor and first windings of the plurality of transformers to generate an average sensed current; and
generating a plurality of control signals that drives a plurality of regulator blocks of the TLVR based at least on the average sensed current, each regulator block of the plurality of regulator blocks being configured to generate a current that flows through a first winding of a corresponding transformer of the plurality of transformers to generate a phase of the output voltage of the TLVR.

16. The method of claim 15, wherein the plurality of control signals comprises interleaved pulse width modulation (PWM) signals.

17. The method of claim 15, wherein sensing the currents that flow through the compensation inductor and the first windings of the plurality of transformers to generate the average sensed current comprises:

receiving an output inductance of the TLVR and an inductance of each first winding of the plurality of transformers as inputs to an averaging inductor direct current resistance (DCR) current sense circuit to generate an average sensed voltage; and converting the averaged sensed voltage to the averaged sense current.

18. The method of claim 17, wherein the averaging inductor DCR current sense circuit comprises a resistor-capacitor (RC) network, and the average sensed voltage is sensed across a capacitor of the RC network.

* * * * *